United States Patent [19]

Hess et al.

[11] Patent Number: 5,598,464
[45] Date of Patent: Jan. 28, 1997

[54] METHOD AND APPARATUS FOR PROVIDING LOCAL NUMBER PORTABILITY

[75] Inventors: Thomas L. Hess, Plano, Tex.; William R. Minch, Arlington Heights, Ill.

[73] Assignee: DSC Communications Corporation, Plano, Tex.

[21] Appl. No.: 493,773

[22] Filed: Jun. 20, 1995

[51] Int. Cl.$^6$ .............................. H04Q 3/62; H04M 3/42
[52] U.S. Cl. ................ 379/213; 379/201; 379/207; 379/220; 379/219; 379/211; 379/212; 379/230; 379/229
[58] Field of Search .............................. 379/207, 213, 379/211, 212, 210, 220, 221, 230, 201, 219, 225, 229

[56] References Cited

U.S. PATENT DOCUMENTS

| | | | |
|---|---|---|---|
| 4,754,479 | 6/1988 | Bicknell et al. | 379/207 |
| 5,237,604 | 8/1993 | Ryan | 379/220 |
| 5,255,315 | 10/1993 | Bushnell | 379/230 |
| 5,315,636 | 5/1994 | Patel | 379/211 |
| 5,353,331 | 10/1994 | Emery et al. | 379/207 |
| 5,384,831 | 1/1995 | Creswell | 379/207 |
| 5,422,941 | 6/1995 | Hasenauer et al. | 379/207 |
| 5,440,620 | 8/1995 | Slusky | 379/211 |
| 5,440,626 | 8/1995 | Boyle et al. | 379/242 |
| 5,442,689 | 8/1995 | Buttitta | 379/243 |
| 5,448,633 | 9/1995 | Jammaleddin et al. | 379/201 |
| 5,452,350 | 9/1995 | Reynolds et al. | 379/220 |
| 5,454,034 | 9/1995 | Martin | 379/220 |

OTHER PUBLICATIONS

Hal et al., "Service Script Interpreter, An Advanced Intelligent Network Platform," 1990, pp. 12–22.

Mark D. Foster, "An Elaboration of the Split Number Space Implementation of Portability," *Stratus*, Mar. 1, 1995, pp. 1–24.

Mark D. Foster, "A Review of Signaling Systems for Number Portability," *Stratus Computers, Inc.*, Jan. 24, 1995, pp. 1–10.

E. Sonnenberg, et al., "Service Provider Area (SPA) Code Local Number Portability Concept," *Siemens Stromberg–Carlson*, Feb. 14, 1995, pp. 1–16 (18 pages total).

EdS, "Local Number Portability SPA Model Evolution to Name & Address," *Siemens Stromberg–Carlson*, Mar. 7, 1995, pp. 1–3.

EdS, "Local Number Portability Evolution of SPA Model," *Siemens Stromberg–Carlson*, Mar. 7, 1995, pp. 1–11.

"LNP Target Architecture Summary (Outline)," Source Unknown, Date Unknown, pp. 1–10.

"Number Portability—Evolution," Source Unknown, Jan. 12, 1995, pp. 1–10.

"Local Area Number Portability (LANP) (An AIN 0.1 Database Service) Third Contribution," *Electric Lightwave, Inc.*, Dec. 7, 1994, pp. 1–4.

"AT&T Local Number Portability Proposal," *AT&T*, Jan. 1, 1995, pp. 1–7.

"Local Number Portability—MCI Metro Outline," *BNR, MCI, Northern Telecom*, Dec. 12, 1994, pp. 1–24.

Hyuk Byun, "TCAP Protocol," *Siemens Stromberg–Carlson*, Dec. 8, 1994, pp. 1–7.

Hyuk Byun, "Prototype Protocol Definition," *Siemens Stromberg–Carlson*, Dec. 8, 1994, pp. 1–7.

(List continued on next page.)

*Primary Examiner*—Krista M. Zele
*Assistant Examiner*—Parag Dharia
*Attorney, Agent, or Firm*—Baker & Botts, L.L.P.

[57] ABSTRACT

A system (10) includes a calling party (12) that initiates a call to a ported customer (14). Upon receiving the call from calling party (12), switch (16) generates a trigger indicating that ported customer (14) is now being serviced by another switch (20). Switch (16) transfers the call to a service node (22) that includes a database (28) containing routing information. Service node (22) routes the call to switch (20) now providing service to ported customer (14). Several variations of calls to ported customer (14) are described.

20 Claims, 4 Drawing Sheets

OTHER PUBLICATIONS

Hyuk Byun, "Long Term Protocol Definition," *Siemens Stromberg–Carlson*, Dec. 8, 1994, pp. 1–4.

S. Edge, "Support of Number Portability By SS7 ISUP," *Siemens Stromberg–Carlson*, Dec. 6, 1994, Solo Page.

Feza Buyukdura, "SS7/AIN Feature Interaction," *Siemens Stromberg–Carlson*, Dec. 8, 1994, pp. 1–14.

EdS, "Proposal for Directory Number Portability Among Service Providers:" *Siemens Stromberg–Carlson*, Nov. 28, 1994, pp. 1–7.

"Figure 1," Source Unknown, Date Unknown, Solo Page.

"Figure 2," Source Unknown, Date Unknown, Solo Page.

Bill Welter, "Local/National Number Portability," *MCI*, Nov. 16, 1994, pp. 1–10.

"Local Number Portability," *MCI*, Date Unknown, pp. 1–7.

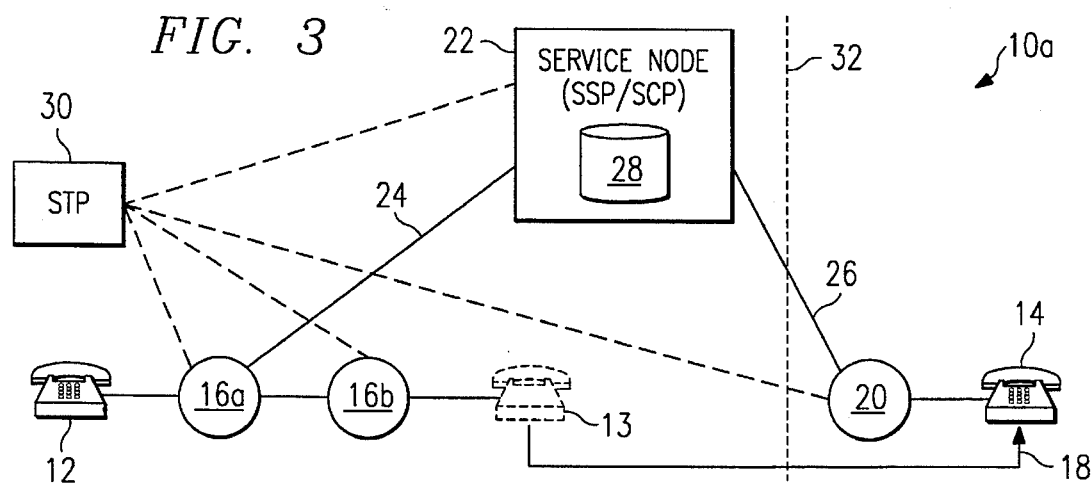
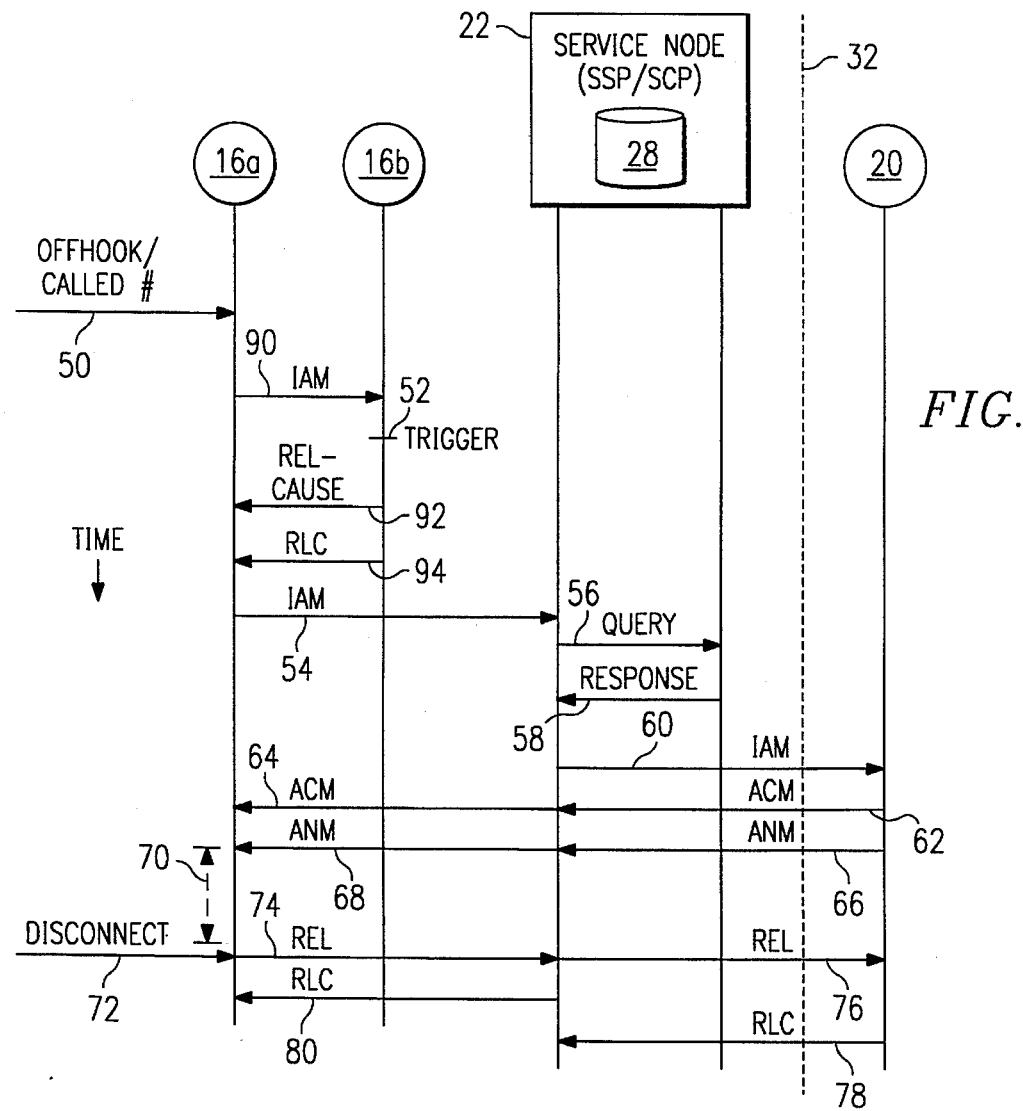

METHOD AND APPARATUS FOR PROVIDING LOCAL NUMBER PORTABILITY

TECHNICAL FIELD OF THE INVENTION

This invention relates generally to telecommunications, and more particularly to a method and apparatus for providing local number portability.

BACKGROUND OF THE INVENTION

Both public and private communications switching networks are arranged as groups of interconnected switches. A local service provider maintains a network of interconnected switches to provide service to its customers. The switches are coupled by trunks and each switch serves a number of connected station devices, such as telephones, terminals, and computers. To establish communication between two stations, a calling party dials a number of the called party. The interconnected switches route the call to the called party in accordance with the dialed number.

When customers change service providers or move locations within their service provider area it is desirable to keep the same number. For example, businesses may incur substantial costs if their telephone number changes due to the large inventory of business cards, stationery, and advertising materials. Local number portability (LNP) allows customers to change service providers or move to a different location in the current service provider area without changing their telephone number.

One of the problems associated with several LNP approaches is the requirement of software changes in the switches of the communications switching network. Other approaches, such as permanent call forwarding, introduce the problem of reduced calling features available to the customers.

SUMMARY OF THE INVENTION

In accordance with the present invention, the disadvantages and problems associated with prior systems and methods to provide local number portability (LNP) services have been substantially reduced or eliminated.

In accordance with one embodiment of the present invention, a system for delivering a call to a called party having a telephone number includes a first switch that generates a trigger indicating that the called party is no longer serviced by the first switch. A service node coupled to the first switch receives the call in response to the trigger generated by the first switch. The service node generates routing information. A second switch coupled to the service node and identified by the routing information receives the call from the service node and completes the call to the called party using the telephone number.

In accordance with another aspect of the present invention a method for delivering a call to a called party having a telephone number includes: receiving the call at a first switch; generating a trigger at the first switch indicating that the called party is no longer serviced by the first switch; receiving the call at a service node in response to the trigger; generating routing information at the service node; receiving the call at a second switch identified by the routing information; and completing the call to the called party using the telephone number.

Important technical advantages of the present invention include providing LNP services without requiring changes in switch software. The present invention supports LNP services when customers change service providers and when customers move to new serving switches within the same service provider area. Furthermore, the present invention can port a local number while still providing full caller services to the customer. Other advantages include limiting participation to only those network operators in the area of portability, minimizing the number of database accesses to route the call, and reducing the number of trunk group connections required to complete the call. Moreover, the present invention can provide LNP services without modifying the dialed number.

BRIEF DESCRIPTION OF THE DRAWINGS

For a more complete understanding of the present invention, and for further features and advantages, reference is now made to the following description taken in conjunction with the accompanying drawings, in which:

FIG. 3 illustrates one embodiment of a system for delivering an inter-office call to a ported customer;

FIG. 4 illustrates the call flow for the inter-office call of FIG. 3;

DETAILED DESCRIPTION OF THE INVENTION

Figure 1:
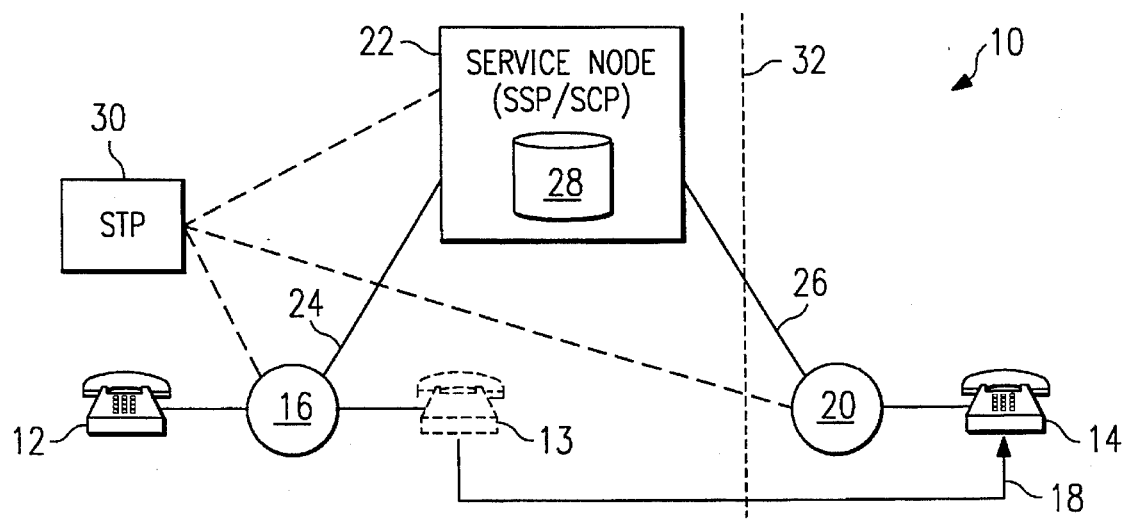
FIG. 1 illustrates a system for delivering an intra-office call to a ported customer.

FIG. 1 illustrates a system 10 for delivering an intra-office call initiated by a calling party 12 to a ported customer 14. Originally, switch 16 serviced ported customer 14, as indicated by ghost lines 13. Therefore, the call placed by calling party 12 to ported customer 14 before porting would be an intra-office call since it would pass through a single switch 16. After porting, as shown graphically by arrow 18, switch 20 now services ported customer 14.

A service node 22 is coupled to switch 16 using an incoming trunk group 24 and to switch 20 using an outgoing trunk group 26. Service node 22 comprises a database 28 which contains routing information for delivering the call to switch 20 and ported customer 14. Service node 22 may comprise a service node with integrated database, a tandem switch or service switching point (SSP) coupled to a service control point (SCP) over a signaling system seven (SS-7) link, or any other architecture, whether integrated or in separate components, that can receive calls from switch 16 on incoming trunk group 24, access routing information, and route calls to switch 20 on outgoing trunk group 26. Service node 22 would be coupled to all switches in the local access and transport area (LATA) that currently services ported customers or previously serviced customers that have now ported.

Switch 16, switch 20, and service node 22 communicate over SS-7 signaling links using a signal transfer point (STP) 30. The SS-7 signaling links, shown in FIG. 1 as dashed lines, allow components of system 10 to communicate messages for routing the call to ported customer 14.

Separator 32 between switch 16 and switch 20 indicates movement of ported customer 14 to a new switch. Separator 32 may represent a boundary between an old service provider associated with switch 16 and a new service provider associated with switch 20. In this situation, ported customer 14 changes service providers with or without changing geographic location. In addition, separator 32 may represent a geographical boundary between the area served by switch 16 and switch 20, both maintained by a single service provider.

Whether ported customer 14 changes service providers or moves to a different geographic location within the same service provider, system 10 delivers the call without changing the called number. This is possible since switch 16 and switch 20 can maintain a common numbering scheme for the stations they service. For example, where ported customer 14 changes service providers, switch 20 may be configured to service many of the same NXX-XXXX numbers of switch 16 to accommodate ported customers in the same service area. Alternatively, switch 20 can include additional routing capabilities to identify ported customer 14 with the called number.

Upon porting, switch 20 maintains customer data for ported customer 14, including customer local area signaling services (CLASS) features. Switch 20 may create customer data at the time of porting or obtain customer data from switch 16. Therefore, switch 16 need not maintain customer information locally other than an indication that ported customer 14 has ported. This indication may be the absence of ported customer 14 at switch 16. Maintaining information on ported customer 14 at switch 20 minimizes the reliance on switch 16 after porting and provides ported customer 14 with the full complement of CLASS features. Furthermore, switch 20 can provide billing services for ported customer 14.

Figure 2:
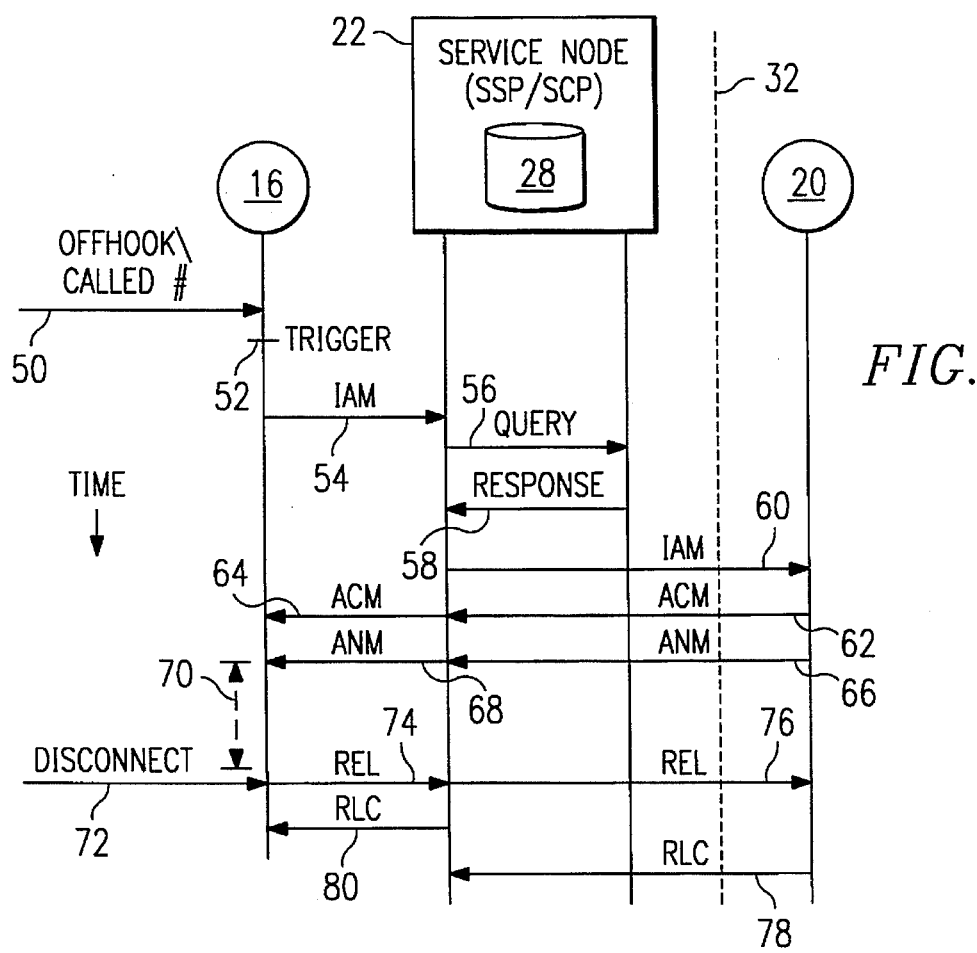
FIG. 2 illustrates the call flow for the intra-office call of FIG. 1.

FIG. 2 illustrates the SS-7 signaling between switch 16, service node 22, and switch 20 to deliver an intra-office call to ported customer 14. Each of the SS-7 messages illustrated in FIG. 2 are communicated between switch 16, service node 22, and switch 20 using STP 30. The call flow proceeds chronologically from top to bottom, but FIG. 2 is not intended to convey relative timing information. Each event in the call flow is given a numerical identifier. Calling party 12 initiates a call that would have been an intra-office call before porting by taking the telephone or other station device off-hook and entering a called number for ported customer 14 (at 50). Switch 16 attempts to place the call to the old location of ported customer 14 before porting to switch 20, as shown graphically by ghost lines 13. When switch 16 attempts to place the call a trigger is generated (at 52). Switch 16 may trigger on a vacant code, which provides a single treatment for the intra-office call. In other embodiment, switch 16 may trigger on an intercept condition, which may allow the flexibility of several treatments for the call. Switch 16 may also trigger on an indication that the called number is a ported number, for example, using NPA-NXX number groups or using a database lookup. Detection of a trigger (at 52) embodies any operation at switch 16 to indicate that ported customer 14 is no longer serviced by switch 16.

Using any of the triggers described above, switch 16 recognizes the called number as associated with ported customer 14 and generates an initial address message (IAM) that comprises the calling number of calling party 12 and the called number of ported customer 14 (at 54). To route the call from switch 16 to service node 22 using incoming trunk group 24, switch 16 sends the initial address message (IAM) using STP 30 to service node 22 over SS-7 links. Upon successfully routing the call, service node 22 may recognize calls received on incoming trunk group 24 to be ported calls requiring a specific treatment to provide LNP services. Alternatively, service node 22 may receive another SS-7 message or other indication, such as the IAM message content itself, that LNP treatment of the call is desired.

Upon recognizing the ported call, service node 22 initiates a query (at 56) that accesses database 28 to receive routing information for ported customer 14. The query may include a lookup in database 28 using the called number of ported customer 14. Database 28 retrieves routing information for ported customer 14 and sends a response (at 58), which identifies outgoing trunk group 26 coupling service node 22 to switch 20. If service node 22 comprises several switches, each with associated trunk groups, then the response from database 28 may identify one of a plurality of switches within service node 22 and the associated trunk group of the identified switch that couples to switch 20. Service node 22 can also receive non-ported calls from switch 16 and provide the proper treatment.

After receiving a response from database 28 identifying outgoing trunk group 26 coupled to switch 20, service node 22 sends to switch 20 an initial address message (IAM) which includes the calling number of calling party 12 and the called number of ported customer 14 (at 60). In one embodiment, the called number in the first initial address message (IAM) communicated between switch 16 and service node 22 (at 54) is the same as the called number in the second initial address message (IAM) communicated between service node 22 and switch 20 (at 60).

Switch 20 recognizes that it currently services ported customer 14, and generates messages to establish the intra-office call. Switch 20 sends an address complete message (ACM) to service node 22 (at 62). Service node 22 sends a similar address complete message (ACM) to switch 16 (at 64) indicating that routing of the call is complete. When ported customer 14 answers the call from calling party 12, switch 20 sends an answer message (ANM) to service node 22 (at 66), and service node 22 sends an answer message (ANM) to switch 16 (at 68). Calling party 12 and ported customer 14 communicate in the time interval indicated by arrow 70.

Upon completion of the call, calling party 12 disconnects (at 72). In response, switch 16 sends a release message (REL) to service node 22 (at 74). Service node 22 releases the switched path, sends a release complete message (RLC) to switch 16 (at 80), and sends a release message (REL) to switch 20 (at 76). Switch 20 releases the switched path and sends a release complete message (RLC) to service node 22 (at 78).

FIGS. 3–6 illustrate how an inter-office call is delivered to ported customer 14 using two different switch control and routing schemes. FIG. 3 illustrates a system 10a for delivering an inter-office call using a "release with cause" capability. Calling party 12 is coupled to switch 16a, which is in turn coupled to switch 16b. Originally, switch 16b serviced ported customer 14, as indicated by ghost lines 13. After porting, as shown by arrow 18, switch 20 now services ported customer 14. The call placed by calling party 12 to ported customer 14 before porting would be an inter-office call since it would pass through both switch 16a and switch 16b. Both switch 16a and switch 16b communicate with other components of system 10a using the SS-7 signaling links supported by STP 30. In this embodiment, though switch 16b may be coupled to service node 22 using a trunk group, the primary delivery path of the inter-office call with the "release with cause" capability is provided by switch 16a to service node 22 using incoming trunk group 24.

FIG. 4 illustrates the SS-7 signaling between switch 16a, switch 16b, service node 22, and switch 20 to deliver an inter-office call to ported customer 14 using the "release with cause" capability. As in FIG. 2, calling party 12 initiates a call by taking the telephone or other station device off-hook and entering the called number of ported customer 14 (at 50). Switch 16a receives an indication of the call from calling party 12 and sends to switch 16b an initial address message (IAM) which includes the calling number of calling party 12 and the called number of ported customer 14 (at 90). In a similar fashion to switch 16 in FIG. 2, switch 16b generates a trigger indicating that ported customer 14 is no longer serviced by switch 16b (at 52). Switch 16b then generates a "release with cause" message (REL-CAUSE) with the cause value set to "number changed" or some other network specific value to indicate that ported customer 14 has been ported (at 92). Upon receiving the release with cause message (REL-CAUSE) from switch 16b, switch 16a sends a release complete message (RLC) to switch 16b (at 94). The call is completed in a similar manner as indicated by events 54–80, described with reference to the intra-office call of FIG. 2.

Switch 16b may or may not be able to generate a release with cause message (EL-CAUSE). If switch 16b cannot generate a release with cause message (REL-CAUSE), then switch 16b routes the call to service node 22 for delivery to ported customer 14. If switch 16b can generate a release with cause message (REL-CAUSE), it may decide whether a release with cause is appropriate. For example, if switch 16b can determine—based on the incoming trunk of the call, the calling number, or some other indication—that the call is inter-office and intra-LATA, then switch 16b may generate a release with cause message (REL-CAUSE). However, switch 16b may determine that a release with cause is inappropriate, for example, when the call is received from a switch in another network. Switch 16b may decide whether to release the call based on the nature of the call (intra-network or inter-network), the call traffic on trunk groups between switch 16a, switch 16b, and service node 22, or any other factor important to network performance or efficient call routing.

Figure 5:
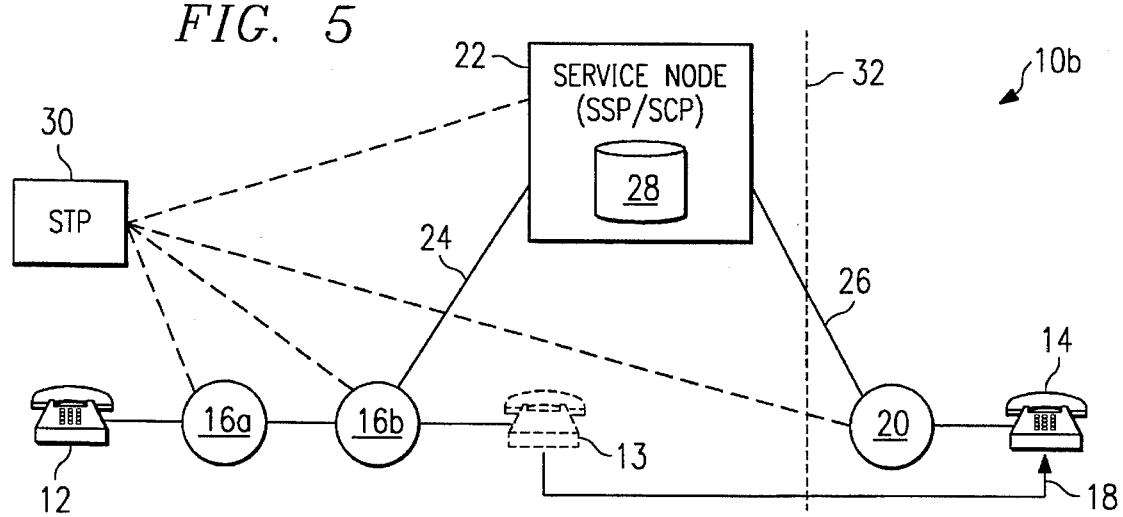
FIG. 5 illustrates a second embodiment of a system for delivering an inter-office call to a ported customer.

FIG. 5 illustrates a system 10b for delivering an inter-office call from calling party 12 to ported customer 14 without using a "release with cause" capability. As in FIG. 3, a call placed by calling party 12 to ported customer 14 before porting would route through switch 16a and terminate at switch 16b. In this embodiment, though switch 16a may be coupled to service node 22 using a trunk group, the primary delivery path of the inter-office call without the "release with cause" capability is provided by switch 16b to service node 22 using incoming trunk group 24. Switch 16b does not generate a release with cause to allow switch 16a to route the call, but instead switch 16b generates a trigger indicating that ported customer 14 is no longer serviced and routes the call to service node 22.

Figure 6:
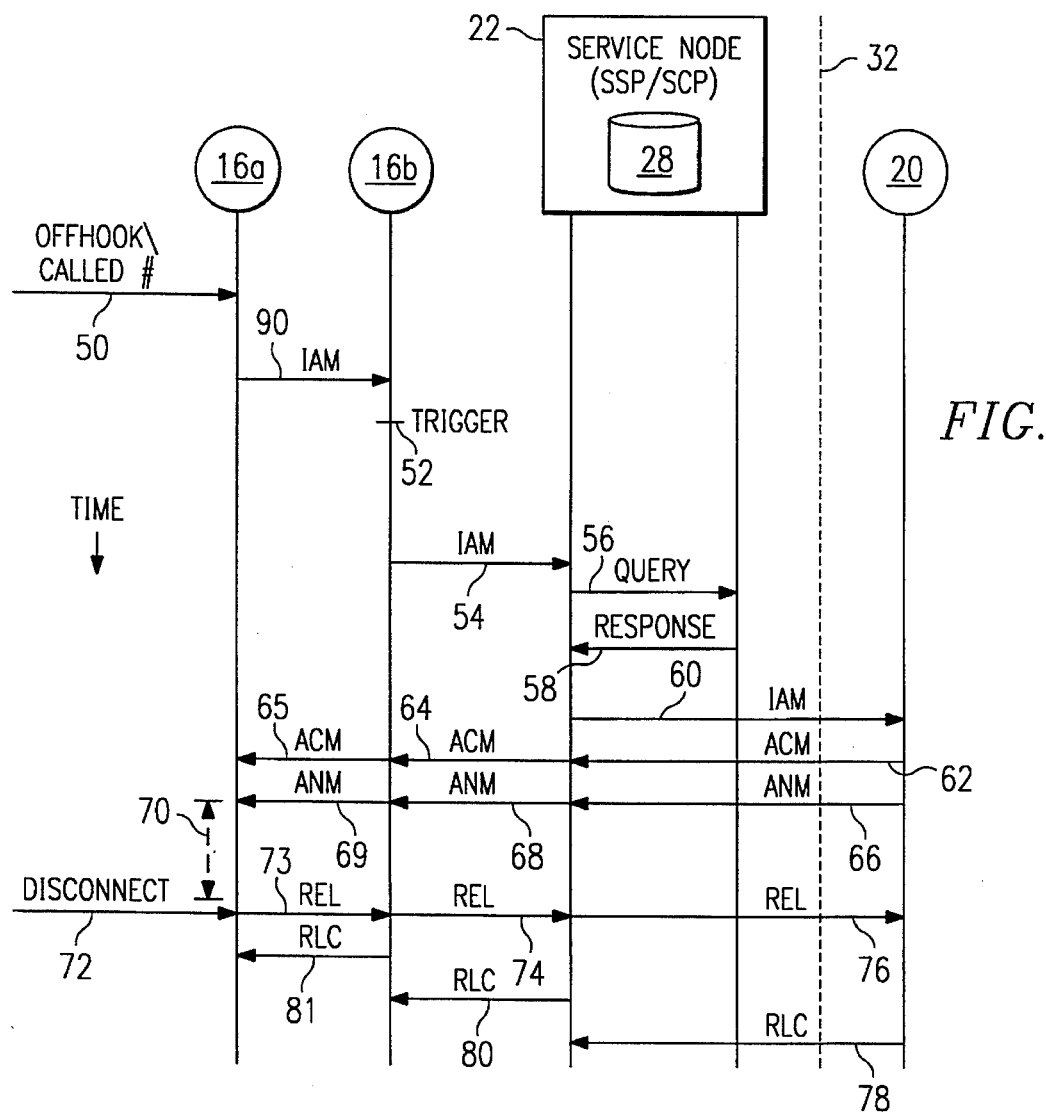
FIG. 6 illustrates the call flow for completing the inter-office call of FIG. 5.

FIG. 6 illustrates the SS-7 signaling between switch 16a, switch 16b, service node 22, and switch 20 to deliver an inter-office call to ported customer 14 without using the "release with cause" capability. Calling party 12 initiates the call by taking the telephone or other station device off-hook and entering the called number (at 50). Upon receiving an indication of the inter-office call, switch 16a sends to switch 16b an initial address message which includes the calling number of calling party 12 and the called number of ported customer 14 (at 90). Switch 16b generates a trigger (at 52). Switch 16b does not send a release with cause message back to switch 16a, but instead completes the call by sending an initial address message (IAM) with the calling number and the called number to service node 22 (at 54).

The inter-office call is completed in a similar manner as indicated by events 56–80, described with reference to the intra-office call of FIG. 2. However, since switch 16b does not generate a release with cause, the call between calling party 12 and ported customer 14 passes through an additional segment coupling switch 16a and switch 16b. This additional segment of the call results in additional call set-up and release messages, indicated by ACM 65, ANM 69, REL 73, and RLC 81. Therefore, the release with cause capability as described with reference to FIGS. 3 and 4 decreases the number of SS-7 messages and trunk groups for delivering the call to ported customer 14.

Figure 7:
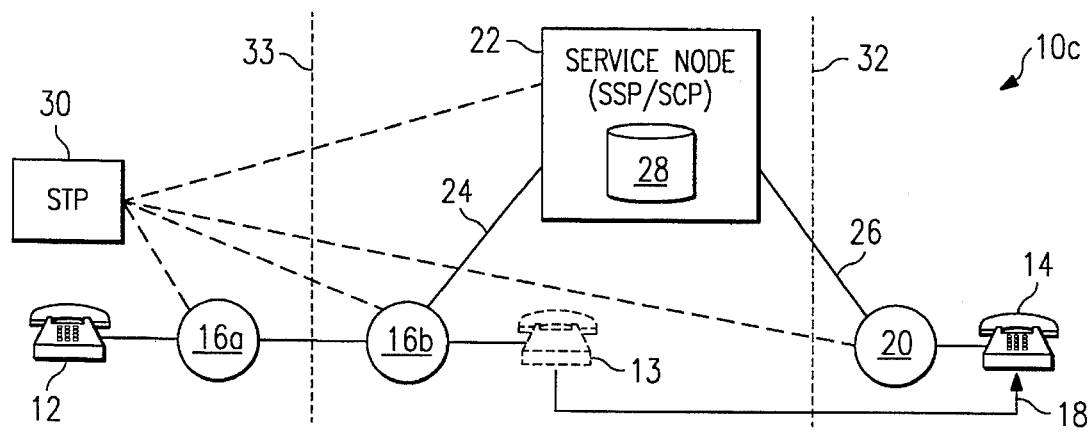
FIG. 7 illustrates a system for delivering an inter-network call to a ported customer.

FIG. 7 illustrates a system 10c for delivering an inter-network call from calling party 12 to ported customer 14. In this embodiment, switch 16a resides in a different service provider network than switch 16b, as indicated by network boundary 33. The inter-network call transferred from switch 16a to switch 16b may pass through any number of inter-exchange carriers (IXCs) or other networks before reaching switch 16b. As in FIG. 5, switch 16b is coupled to service node 22 using incoming trunk group 24.

Figure 8:
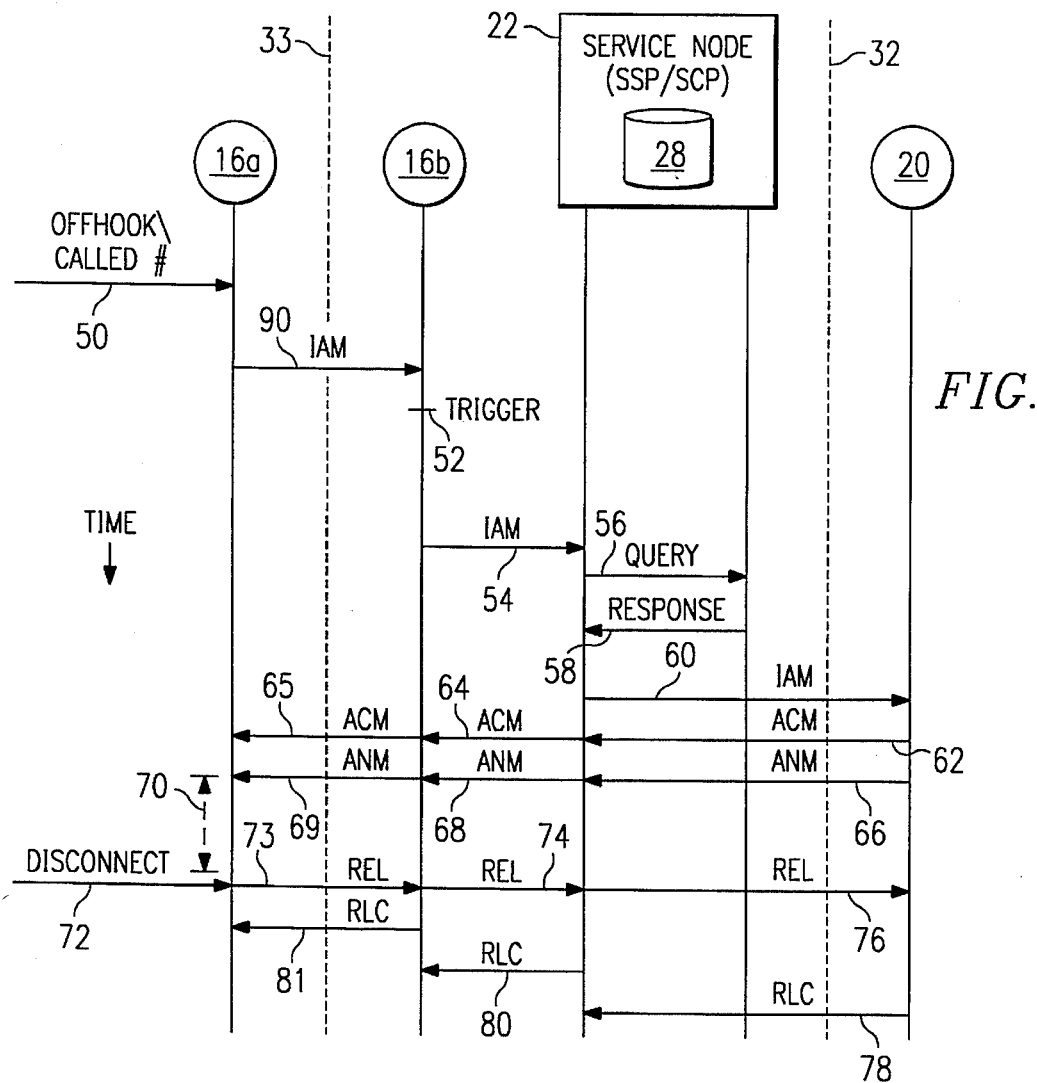
FIG. 8 illustrates the call flow for the inter-network call of FIG. 7.

FIG. 8 illustrates the SS-7 signaling between switch 16a, switch 16b, service node 22, and switch 20 to deliver an inter-network call from calling party 12 to ported customer 14. Network boundary 33 indicates that SS-7 messaging between switch 16a and switch 16b is across network boundaries. The call flow proceeds in a similar manner as the inter-office call described with reference to FIG. 6. For an inter-network call, it is undesirable to generate a release with cause message at switch 16b. This may force switch 16a in another network to take action, even though the other network may not support or be aware of LNP services.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system for delivering a call to a ported called party having an associated pre-porting telephone number, comprising:

a first switch operable to receive the call, the first switch assigned to service the pre-porting telephone number, the first switch operable to attempt to place the call to the called party, the first switch further operable to generate a trigger if the called party is no longer serviced by the first switch;

a service node coupled to the first switch, the service node operable to receive the call in response to the trigger generated by the first switch, the service node operable to generate routing information; and a second switch coupled to the service node and identified by the routing information, the second switch operable to receive the call from the service node and to complete the call to the called party using the pre-porting telephone number.

2. The system of claim 1 wherein the trigger comprises a predetermined intercept condition.

3. The system of claim 1 wherein the service node comprises a tandem switch and a service control point.

4. The system of claim 1 wherein the service node comprises a database operable to store routing information indexed by the pre-porting telephone number.

5. The system of claim 1 wherein the service node comprises a database operable to store routing information indexed by the pre-porting telephone number, the service node operable to perform a database lookup in response to receiving the call from the first switch on an incoming trunk group associated with ported calls.

6. The system of claim 1 wherein the routing information identifies a trunk group of the service node coupled to the second switch.

7. The system of claim 1 wherein the first switch is associated with a first service provider and the second switch is associated with a second service provider.

8. The system of claim 1 wherein the call is an inter-network call that originates outside a telephone service provider network that includes the first switch.

9. The system of claim 1 further comprising a third switch coupled to the first switch and the service node, the first switch operable to release the call upon generating the trigger, the third switch operable to receive the call released by the first switch and to deliver the call to the service node.

10. A service node for delivering a call to a called party that has ported from a first switch to a second switch, the called party serviced by the second switch and having a pre-porting telephone number assigned to the first switch, the service node comprising:

a first trunk group operable to receive the call from the first switch upon the generation of a trigger by the first switch after an unsuccessful attempt to place the call at the first switch, the trigger indicating that the called party is no longer serviced by the first switch;

a database operable to store routing information identifying the second switch as a switch that services the called party; and a second trunk group coupled to the first trunk group and the second switch, the second trunk group operable to deliver the call to the second switch according to the routing information.

11. The service node of claim 10 wherein the service node accesses routing information in the database in response to receiving the call on the first trunk group.

12. The service node of claim 10 wherein the first trunk group is identified in a predetermined intercept condition generated by the first switch.

13. The service node of claim 10 wherein the first trunk group and the second trunk group comprise a tandem switch and the database comprises a service control point.

14. The service node of claim 10 wherein the routing information identifies the second trunk group.

15. A method for delivering a call to a ported called party having an associated pre-porting telephone number, comprising:

receiving the call at a first switch, the first switch assigned to service the pre-porting telephone number;

attempting to place the call to the called party at the first switch;

generating a trigger at the first switch if the first switch is unsuccessful in placing the call, the trigger indicating that the called party is no longer serviced by the first switch;

receiving the call at a service node in response to the trigger;

identifying, at the service node, a second switch as a switch that services the called party;

generating, at the service node, routing information for the second switch;

receiving the call at the second switch according to the routing information; and completing the call to the called party using the pre-porting telephone number.

16. The method of claim 15 wherein the trigger comprises a predetermined intercept condition.

17. The method of claim 15 wherein the step of generating routing information at the service node comprises accessing a database having routing information indexed by the pre-porting telephone number.

18. The method of claim 15 further comprising:

releasing the call at the first switch in response to the trigger;

receiving at a third switch the call released by the first switch; and delivering the call to the service node from the third switch.

19. The method of claim 15 wherein the first switch is associated with a first service provider and the second switch is associated with a second service provider.

20. The method of claim 15 wherein the call is an inter-network call that originates outside a telephone service provider network associated with the first switch.

* * * * *